HORIZONTAL AND VERTICAL DEFLECTION OUTPUT CIRCUIT ARRANGEMENT FOR CATHODE RAY TUBE

Filed Dec. 18, 1968

2 Sheets-Sheet 1

INVENTORS
TAKAO KANAOKA
MINORU MORIO
HAJIME YONEDA

BY

ATTORNEY.

INVENTORS
TAKAO KANAOKA
MINORU MORIO
HAJIME YONEDA
BY
ATTORNEY.

United States Patent Office 3,484,648

Patented Dec. 16, 1969

3,484,648

HORIZONTAL AND VERTICAL DEFLECTION OUTPUT CIRCUIT ARRANGEMENT FOR CATHODE RAY TUBE

Takao Kanaoka, Kanagawa-ken, and Minoru Morio and Hajime Yoneda, Tokyo, Japan, assignors to Sony Corporation, Tokyo, Japan, a corporation of Japan Filed Dec. 18, 1968, Ser. No. 784,649

Claims priority, application Japan, Dec. 18, 1967, 42/80,809

Int. Cl. H01j *29/70*

U.S. Cl. 315—24 8 Claims

ABSTRACT OF THE DISCLOSURE

The horizontal and vertical deflection output circuits for a cathode ray tube are connected with a power source of DC voltage through a multipurpose circuit having circuit elements acting as a low pass filter with respect to the DC voltage for suppressing the ripple therein and also acting as an integrating circuit with respect to a sawtooth wave current from the vertical deflection output circuit for producing a raster distortion correcting signal therefrom, and the ripple suppressed DC voltage is supplied through the multipurpose circuit to the horizontal and vertical deflection output circuits with the raster distortion correcting signal being superimposed on the DC voltage supplied to the horizontal deflection output circuit.

This invention relates to a horizontal and vertical deflection output circuit arrangement for use with an electromagnetic deflection type cathode ray tube, for example, in a television receiver, and more particularly it is directed to a novel circuit arrangement of this type by which a DC voltage having a power source ripple component eliminated therefrom or suppressed is applied to the horizontal and vertical deflection output circuits, and a raster distortion correcting signal is supplied to the horizontal deflection output circuit together with the ripple suppressed DC voltage.

In conventional cathode ray tubes of the electromagnetic deflection type, the DC voltages applied to the horizontal and vertical deflection output circuits are usually provided by separate power source circuits which may or may not have filter means for suppressing ripple. Furthermore, for the correction of raster distortion, there is provided an additional circuit constituted by a saturable reactor to supply a raster distortion correcting signal to the deflection coils. However, the use of the foregoing separate circuits for supplying DC voltages to the horizontal and vertical deflection circuits and for producing the raster distortion correcting signal makes the entire circuit arrangement complicated and increases the number of components therein and the manufacturing cost.

Accordingly, it is a primary object of the present invention to provide a simplified circuit arrangement whereby DC voltage substantially free of ripple is supplied to horizontal and vertical deflection output circuits and a raster distortion correcting signal is superimposed on the DC voltage, particularly as supplied to the horizontal deflection output circuit.

According to an aspect of this invention, the horizontal and vertical deflection output circuits for a cathode ray tube are connected with a power source of DC voltage through a multipurpose circuit having circuit elements acting as a low pass filter with respect to the DC voltage from the power source for suppressing ripple therein and also acting as an integrating circuit with respect to a sawtooth wave current from the vertical deflection output circuit for producing the raster distortion correcting signal therefrom, and the ripple suppressed DC voltage is supplied through such multipurpose circuit to the horizontal and vertical deflection output circuits with the raster distortion correcting signal being superimposed on the DC voltage to the horizontal deflection output circuit.

The above, and other objects, features and advantages of the invention, will be apparent in the following detailed description of illustrative embodiments which is to be read in connection with the accompanying drawings, wherein.

Figure 1:
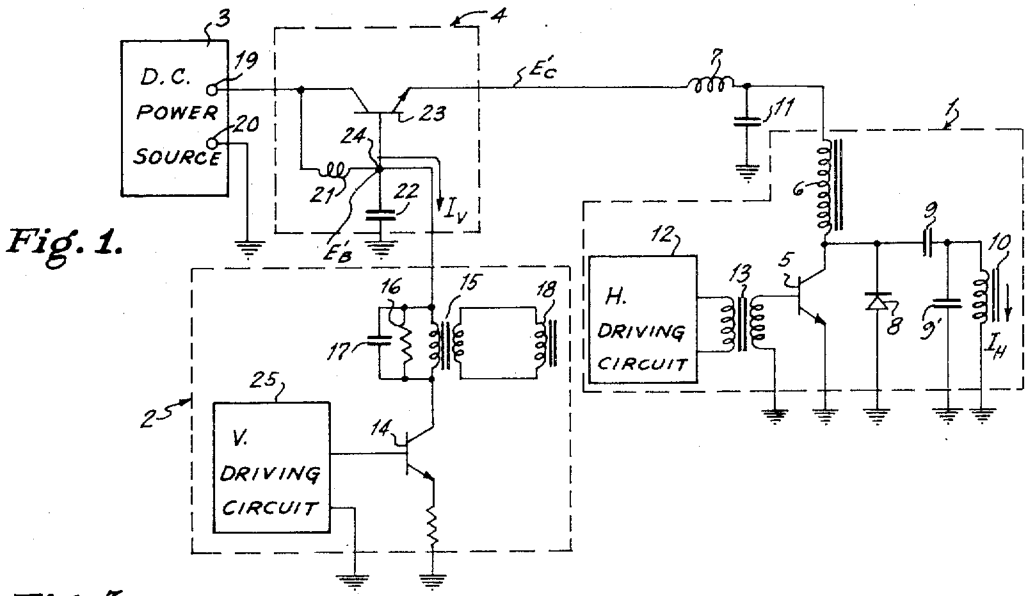
FIG. 1 is a diagrammatic view of a horizontal and vertical deflection circuit arrangement according to an embodiment of the present invention.

Referring to FIG. 1 of the drawings in detail, it will be seen that a circuit arrangement according to this invention generally comprises a horizontal deflection output circuit 1, a vertical deflection output circuit 2, a DC power source 3 for these horizontal and vertical deflection output circuits, and a multipurpose circuit 4 through which the circuits 1 and 2 are connected with the power source 3.

The horizontal deflection output circuit 1 is shown to include an emitter-grounded deflection output transistor 5 and a flyback transformer 6 connected between the collector of the transistor 5 and the multipurpose circuit 4 through an inductor 7 adapted to block the horizontal deflection frequency. A damper diode 8 is connected between the collector of transistor 5 and the ground, a horizontal deflection coil 10 is connected between the collector of transistor 5 and the ground through a direct current blocking capacitor 9, a resonance capacitor 9' is connected in parallel with coil 10, and a capacitor 11 is interposed between a junction between inductor 7 and transformer 6 and the ground to by-pass the horizontal deflection frequency. Horizontal deflection drive pulses are imparted between the base of transistor 5 and the ground through a transformer 13 by a horizontal deflection drive circuit 12.

The vertical deflection output circuit 2 is shown to include an emitter-grounded vertical deflection output transistor 14, a vertical deflection output transformer 15 having its primary winding connected between the collector of transistor 14 and the multipurpose circuit 4, a resistor 16 and a capacitor 17 which may be connected in parallel with the primary winding of transformer 15, and a vertical deflection coil 18 connected with the secondary winding of the transformer 15. A vertical drive saw-tooth wave is supplied between the base of transistor 14 and the ground from a vertical deflection drive circuit 25.

The power source 3 is provided with a pair of output terminals 19 and 20 which are respectively connected with the multipurpose circuit 4 and the ground.

The multipurpose circuit 4 in the embodiment of FIG. 1 is shown to comprise an inductor or coil 21, a capacitor 22 and a transistor 23. The inductor 21 and capacitor 22 are connected in series between terminal 19 of power source 3 and ground, and a junction 24 between inductor 21 and capacitor 22 is connected to the primary winding of the transformer 15 and to the base of transistor 23. The terminal 19 of power source 3 is further connected through the collector-emitter of transistor 23 and blocking inductor 7 with flyback transformer 6.

In the foregoing arrangement, the terminal 19 of power source 3 is connected with the collector of transistor 5 through the collector-emitter of transistor 23 of the multipurpose circuit 4 and the flyback transformer 6 of the horizontal deflection output circuit 1. Thus the DC voltage power source 3 is supplied to transistor 5 of the horizontal deflection output circuit 1 so as to render the latter operative to cause a horizontal deflection current to flow through horizontal deflection coil 10 in response to the horizontal deflection drive pulses imparted from the horizontal deflection drive circuit 12 to the base of the transistor 5.

Further, since the terminal 19 of power source 3 is connected with the collector of transistor 14 through the inductor 21 of multipurpose circuit 4 and the primary winding of output transformer 15 of the vertical deflection output circuit 2, the DC voltage from power source 3 is supplied to transistor 14 of the vertical deflection output circuit 2 so as to render the latter operative. Consequently, the vertical driving saw-tooth wave applied by the vertical deflection driving circuit 25 to the base of transistor 14 causes a vertical deflection current to flow through vertical deflection coil 18.

It is also to be noted that the potential $V_B$ at junction 24 is applied to the base of transistor 23 of the multipurpose circuit 4 so that the direct current supplied to transistor 5 of the horizontal deflection output circuit 1 is controlled in accordance with that potential $V_B$.

In the arrangement, as described, inductor 21 acts as a series inductor with respect to power source 3, and capacitor 22 acts as a parallel capacitor with respect to source 3. Thus, inductor 21 and capacitor 22 constitute a low pass filter for suppressing the ripple in the DC voltage output of source 3. Furthermore, inductor 21 acts, with respect to vertical deflection output circuit 2, as a series inductor through which flows a saw-tooth wave current $I_V$, as shown at A on FIG. 2, which flows through transistor 14, and capacitor 22 serves as a parallel capacitor with respect to circuit 2. Thus, inductor 21 and capacitor 22 also constitute an integrating circuit for producing a raster distortion correcting parabolic wave signal which, in the example shown is intended to correct a pin-cushion distortion.

Figure 2:
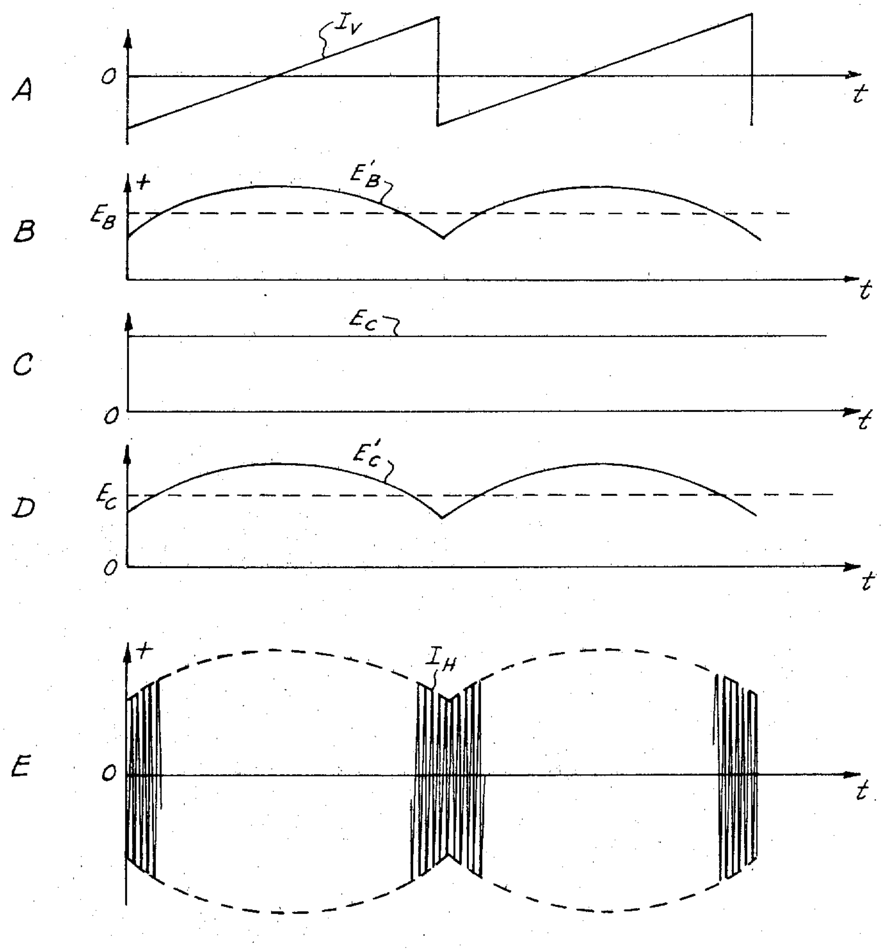
FIG. 2 shows various waveforms to which reference will be made in explaining the operation of the circuit shown in FIG. 1.

Thus, by previously adjusting the inductance of inductor 21 and capacitance of capacitor 22, there is obtained at junction 24, a voltage $E'_B$ resulting from the superimposition of the raster distortion correcting parabolic wave voltage upon the ripple suppressed DC voltage, as shown at B in FIG. 2. Consequently, there occurs at the output of transistor 23 a voltage $E'_C$, as shown at D on FIG. 2, which results from the superimposition of the raster distortion correcting parabolic wave voltage upon the ripple suppressed output DC voltage $E_C$, as shown at C on FIG. 2. Thus, the horizontal deflection output circuit 1 can be stably operated with the ripple suppressed voltage $E_C$ and the superimposed raster correcting voltage $E'_C$ to supply to horizontal deflection coil 10 a horizontal deflection current $I_H$ having the raster distortion correcting current superimposed thereupon, as shown at E on FIG. 2.

The vertical deflection output circuit 2 is also stably operated with the ripple suppressed DC voltage $E_C$ obtained at the junction 24, as described above.

Due to the presence of transistor 23, the multipurpose circuit 4 is capable of supplying a required amount of power to the horizontal deflection output circuit 1 even if the inductance of inductor 21 is low, and it produces an impedance converting function with respect to the raster distortion correcting signal.

As described above, the multipurpose circuit 4 in accordance with the present invention makes it possible to simultaneously and satisfactorily achieve suppression or elimination of power source ripple, the supplying of the ripple suppressed DC voltage to the horizontal and vertical deflection output circuits for powering the same, and the supplying of the raster distortion correcting signal to the horizontal deflection output circuit.

Figure 3:
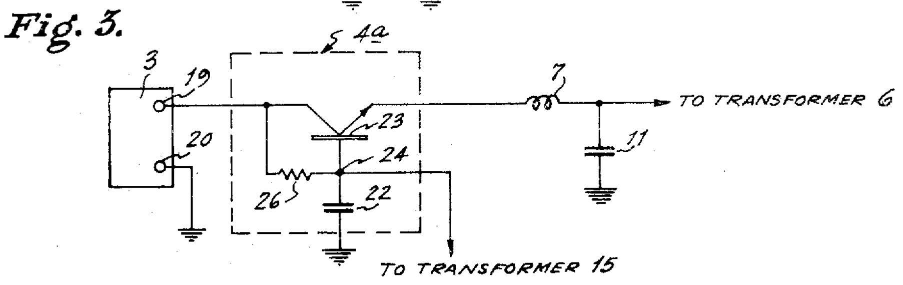
FIGS. 3, 4 and 5 are circuit diagrams showing other embodiments of the main portion of the circuit according to the present invention.

The arrangement shown in FIG. 1 is only illustrative of the circuit elements that may be provided in multipurpose circuit 4 in accordance with the present invention, and various modifications thereof may be provided to perform the above described multiple functions. Thus, for example, as shown in FIG. 3, in a modified multipurpose circuit 4*a*, the inductor 21 of the multipurpose circuit 4 is replaced by a resistor 26, which serves to apply a required bias between the collector and the base of transistor 23. The remainder of the circuit arrangement for use with the circuit 4*a* is the same as that shown in FIG. 1. The resistor 26 and capacitor 22 constitute an integrating circuit by which a parabolic wave voltage is applied to the base of transistor 23 in response to the saw-tooth wave current in the transistor 14. The resistor 26 and capacitor 22 further constitute a RC low pass filter for suppressing the ripple in the DC voltage output of the power source. Needless to say, DC voltage is applied to the transistor 14 of the vertical deflection output circuit through the resistor 26. The multipurpose circuit 4*a* shown on FIG. 3 has an operational effect similar to that described above in connection with FIG. 1, as will be readily apparent to those skilled in the art.

Figure 4:
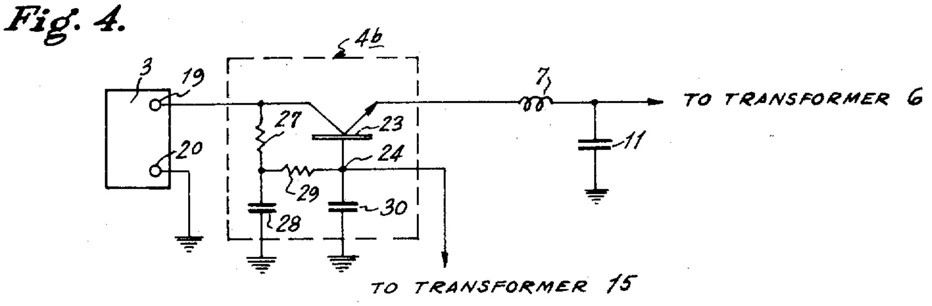

FIG. 4 shows another modified form of multipurpose circuit 4*b* wherein the inductor 21 and capacitor 22 of multipurpose circuit 4 are replaced by a series circuit of resistor 27 and capacitor 28 connected between the collector of transistor 23 and the ground, and a series circuit of resistor 29 and capacitor 30 connected between the connection point between resistor 27 and capacitor 28 and the ground, with the junction 24 between resistor 29 and capacitor 30 being connected to the base of transistor 23 and also to transistor 14 by way of transformer 15. The ladder arrangement of resistors 27 and 29 and capacitors 28 and 30 constitutes a two-stage RC low pass filter for suppressing ripple in the DC output of source 3 and further functions as an integrating circuit to produce the desired raster distortion correcting signal. The FIG. 4 arrangement is capable of producing an increased suppression of power source ripple, as compared with the arrangement shown in FIG. 3. The resistors 27 and 29 serve to impart a bias voltage between the collector and the base of transistor 23, and DC voltage is applied to transistor 14 through the resistors 27 and 29.

Figure 5:
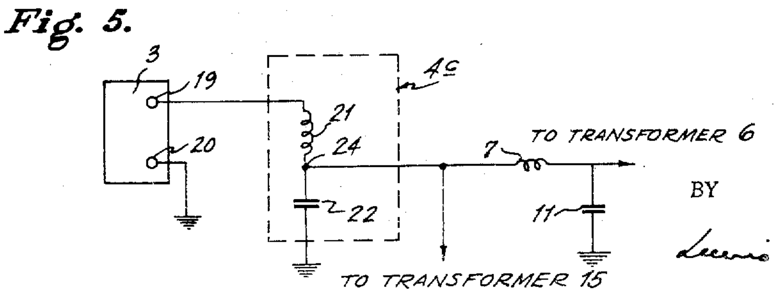

FIG. 5 shows still another modified form of multipurpose circuit 4*c* in which the transistor 23 of the multipurpose circuit 4 shown in FIG. 1 is eliminated, and the junction 24 between inductor 21 and capacitor 22 is connected with the collector of the transistor 5 through the inductor 7 and the transformer 6 and also with the collector of the transistor 14 through the primary of transformer 15. Thus, the power source ripple suppressing circuit function and the integrating circuit function can be performed by the inductor 21 and capacitor 22 alone.

Although illustrative embodiments of the invention have been described in detail herein with reference to the accompanying drawings, it is to be understood that the invention is not limited to those precise embodiments, and that various changes and modifications may be effected therein by one skilled in the art.

What is claimed is:

1. A horizontal and vertical deflection output circuit arrangement for a cathode ray tube, comprising a horizontal deflection output circuit, a vertical deflection output circuit by which a saw-tooth wave current is produced, a power source having a DC voltage output, and a multipurpose circuit through which said horizontal and vertical deflection output circuits are connected with said source, said multipurpose circuit being operative to suppress ripple in said DC voltage output from said power source and supply the resulting ripple suppressed DC voltage to said horizontal and vertical deflection output circuits and to produce a raster distortion correcting signal in response to said saw-tooth wave current, which raster distortion correcting signal is superimposed on said ripple suppressed DC voltage supplied to said horizontal deflection output circuit.

2. A horizontal and vertical deflection output circuit arrangement for a cathode ray tube according to claim 1, in which said multipurpose circuit includes circuit elements acting both as low pass filter means with respect to said DC voltage output from the power source for suppressing the ripple therein and as integrating circuit means with respect to said saw-tooth wave current for producing said raster distortion correcting signal therefrom.

3. A horizontal and vertical deflection output circuit arrangement according to claim 2, in which said circuit elements include at least one inductor and at least one capacitor connected in a low-pass filter circuit configuration as to said DC voltage output from the power source and in an integrating circuit configuration as to said saw-tooth wave current from said vertical deflection output circuit.

4. A horizontal and vertical deflection output circuit arrangement according to claim 3, in which said inductor and capacitor are connected in series across said output of the power source and a junction between said inductor and capacitor is connected to at least said vertical deflection output circuit for said supply of the ripple suppressed DC voltage thereto and so that said inductor and capacitor are in series and parallel, respectively, with said vertical deflection output circuit so as to constitute said integrating circuit configuration for the saw-tooth wave current.

5. A horizontal and vertical deflection output circuit arrangement according to claim 4, in which said junction is also connected to said horizontal deflection output circuit to supply thereto said ripple suppressed DC voltage with said raster distortion correcting signal superimposed thereon.

6. A horizontal and vertical deflection output circuit arrangement according to claim 4, in which said multipurpose circuit further includes a transistor having a collector, emitter and base, said horizontal deflection output circuit is connected with said power source through said collector and emitter of the transistor, and said base of the transistor is connected to said junction between the inductor and capacitor.

7. A horizontal and vertical deflection output circuit arrangement according to claim 2, in which said circuit elements include at least one resistor and at least one capacitor connected in series across said output of the power source and having a junction therebetween connected with said vertical deflection output circuit to receive said saw-tooth wave current therefrom and to supply said ripple suppressed DC voltage thereto, and said multipurpose circuit further includes a transistor having a collector and emitter through which said horizontal deflection output circuit is connected to said power source and a base connected to said junction.

8. A horizontal and vertical deflection output circuit arrangement according to claim 7, in which there are a plurality of resistors and capacitors in a ladder arrangement for multiple stage suppression of the ripple in said DC voltage output from the power source.

References Cited

UNITED STATES PATENTS 3,302,055 1/1967 Slavik ............... 315—24

RODNEY D. BENNETT, Jr., Primary Examiner

T. H. TUBBESING, Assistant Examiner